Sept. 28, 1948.    C. A. DE GIERS ET AL    2,450,331
POINTER RETURN DEVICE.
Filed Dec. 8, 1945

INVENTORS
CLARENCE A. DE GIERS
SOREN B. OSTERLUND
BY Ernest D. Given
ATTORNEY

Patented Sept. 28, 1948

2,450,331

UNITED STATES PATENT OFFICE 2,450,331

POINTER RETURN DEVICE

Clarence A. de Giers, Forest Hills, and Soren B. Osterlund, St. Albans, N. Y., assignors to The Liquidometer Corporation, Long Island City, N. Y., a corporation of Delaware Application December 8, 1945, Serial No. 633,800

6 Claims. (Cl. 171—95)

1

This invention relates to indicating and/or control instruments of the type comprising a rotatably mounted permanent magnet rotor coacting with a plurality of stationary coils connected to be differentially energized, the coaction between the magnetic rotor field and the fields set up by the coil currents placing the rotor in a definite angular position. The angular rotor position can then be indicated by means of a pointer and a scale or be employed to operate a control member.

In instruments of the type above described, sometimes called and hereinafter referred to as "ratiometers" it is frequently necessary or desirable to provide a means for causing the rotor assembly to assume a definite or zero position—such as an off-scale position in case of a pointer indication ratiometer — when no current flows through the coils of the instrument. It will be apparent that without such zero return means the rotor assembly will come to rest in any odd position which may then be interpreted as indicative of a certain value of a physical magnitude controlling the differential energization of the coils, for instance, of the liquid contents of a tank, if it is not known or is disregarded that the instrument coils are deenergized.

Such rotor return devices, as known in the art, generally consist of a single stationary permanent magnet placed near to the rotor assembly. The magnetic fields of the return magnet and of the rotor then coact in such manner that the pole of the return magnet closest to the rotor will attract the pole of the rotor having opposite polarity. As a result of this mutual polar attraction the rotor will be moved into a definite position relative to the position of the return magnet. The position of the stationary return magnet is selected so that the angular position in which the rotor is placed is the desired zero or off-scale position. However, there are two positions of the rotor in which the return magnet does not produce torque on the rotor. The one position is the above described one and is desirable. The other position, which is not desirable, is the result of mutual polar repulsion between the rotor and the return magnet, and is that for which a pole of the rotor has closely approached the same polarity pole of the return magnet. With two similar poles in line with each other, the repulsive force between the magnets acts along a line through the rotor bearings and does not produce torque. The range of positions for which this undesirable condition occurs will hereinafter be referred to as a "dead zone." The rotor assembly may be

2 turned into the dead zone position by the action of the differently energized coils, and if the coil currents should be cut off while the rotor assembly is still in this position, the return magnet will be ineffective to turn the rotor to its desired zero position.

The size of the dead zone is generally defined by the angle within which the return magnet is inoperative, for example, a dead zone of 20 degrees means that the rotor and with it the pointer or control member may occupy any position within a range of 20 degrees without being returnable to the desired zero or off-scale position by the action of the return magnet. It will be obvious that the range of the dead zone is determined partly by the type of magnetic charge introduced into the rotor. That is, if a pole of the rotor, for instance, the north pole, is broad, then the repulsion between such spread-out north pole and an adjacent north pole of the return magnet will be ineffective for returning the rotor into the zero position over a wide dead zone. Conversely, if the pole of the rotor is narrow the dead zone will be comparatively narrow. However, it is frequently not practical to increase the effectiveness of the return magnet by providing narrow rotor poles, since wide poles on the rotor are usually necessary to secure satisfactory operation of the instrument. As a consequence the dead zone is generally a large one in instruments hitherto known.

A general object of the invention is a novel and improved means for returning the rotor assembly of a ratiometer of the type above described into a definite or zero position when the ratiometer coils are deenergized.

Another and more specific object of the invention is to enlarge the range of the angular positions from which the rotor assembly is returnable into its zero or off-scale position in response to a deenergization of the ratiometer coils.

Still another and more specific object of the invention is to provide means for reducing materially the dead zone within which the rotor return device is ineffective without reducing the widths of the rotor poles.

Other and further objects, features and advantages of the invention will appear hereinafter and in the appended claims forming part of the application.

In the accompanying drawing a now preferred embodiment of the invention is shown by way of illustration and not by way of limitation.

In the drawings:
Fig. 1 shows a plan view of an instrument according to the invention, the cover of the instrument housing having been removed;

Figure 2:
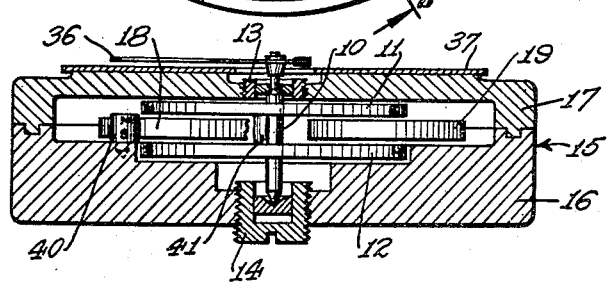
Fig. 2 is a sectional view of the instrument along lines 2—2 of Fig. 1.

The instrument as shown on the drawing, also known as a ratiometer, includes a rotor assembly comprising a shaft or arbor 10 to which are secured spaced apart two permanent magnet discs 11 and 12. These magnet discs are mounted in such position that their poles are opposite to each other as indicated by letters "N" and "S" designating the locations of the respective north and south poles. The shaft or arbor 10 is rotatably supported by means of bearings 13 and 14 in a housing generally designated 15 and having a base part 16 and a cover 17. Bearing 14 is adjustable for adjustment of the axial position of shaft 10 relative to the housing. Magnetically coacting with the rotor assembly is a plurality of deflecting coils. The construction shown in the drawing employs three coils 18, 19 and 20 which are stationarily supported by housing base 16 and fastened thereto by suitable conventional means. The coils are distributed at equal distances about shaft 10, in the illustrated example 120° apart, and extend between magnet discs 11 and 12. As will be seen from Fig. 2, the coils are substantially disc-shaped and so designed that the space between magnet discs 11 and 12 is substantially filled by the coils leaving only sufficient clearance for an unimpeded movement of the rotor assembly.

Figure 3:
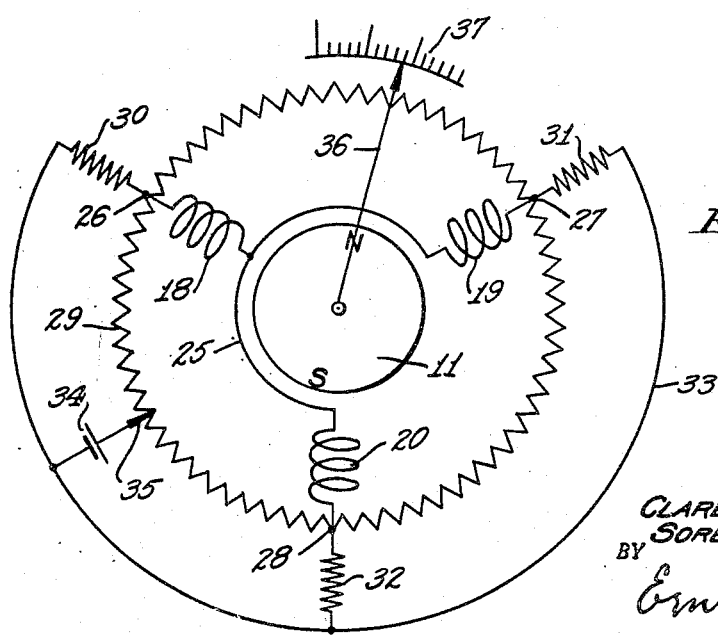
Fig. 3 shows a circuit diagram for an instrument according to Figs. 1 and 2.

As is shown in the circuit diagram according to Fig. 3, the three coils are connected together at their inner terminals by a common wire 25. The outer terminals of the coils are connected to equidistant taps 26, 27 and 28 of a transmitter 29 of the resistance type. The transmitter is shown in form of a circular resistor concentric with the rotor assembly for simplification of the wiring diagram but it should be understood that in practice the transmitter and the part of the circuit associated therewith is generally located at a point remote from the ratiometer proper. The taps 26, 27 and 28 are connected to one of the terminals of resistors 30, 31 and 32 respectively, the other terminals of these resistors being interconnected by a common wire 33 and also to one terminal of a source of current such as a battery 34. The other terminal of the battery is connected to a wiper 35 riding on transmitter resistor 29.

The position of wiper 35 on ring resistor 29 controls the resistance included in the circuit connections of the deflecting coils 18, 19 and 20. The differential energization of the coils affected thereby will cause the rotor assembly to move into an angular position corresponding to the differential energization of the coils. The rotor movement can be employed to operate a control member such as contact means (not shown) or the angular rotor position may be indicated as shown by means of a pointer 36 fastened to shaft 10 and coacting with a stationary scale 37 supported for instance on the cover 17 and calibrated in units of a variable physical magnitude to be supervised.

The wiper movement may be controlled by any suitable agency for instance by a float and linkage system including a float resting on the level of a liquid contained in a tank such as a fuel tank the contents of which is to be supervised. In the latter case scale 37 may be calibrated in gallons or pounds.

The polarities of the deflecting coils are not indicated in the circuit diagram but may be so selected that the pointer will travel clockwise in response to a clockwise movement of transmitter wiper 35.

The transmitter and ratiometer arrangements as hereinbefore described are conventional and not subject matter of the invention. In this connection it should also be noted that the application and usefulness of the invention are not limited to the transmitter and ratiometer arrangement shown and described in this application but the invention may be applied to any type of ratiometer having a magnet rotor. Furthermore the transmitter may be of any conventional or novel design suitable to control a ratiometer.

The invention will now be described in detail.

Figure 1:
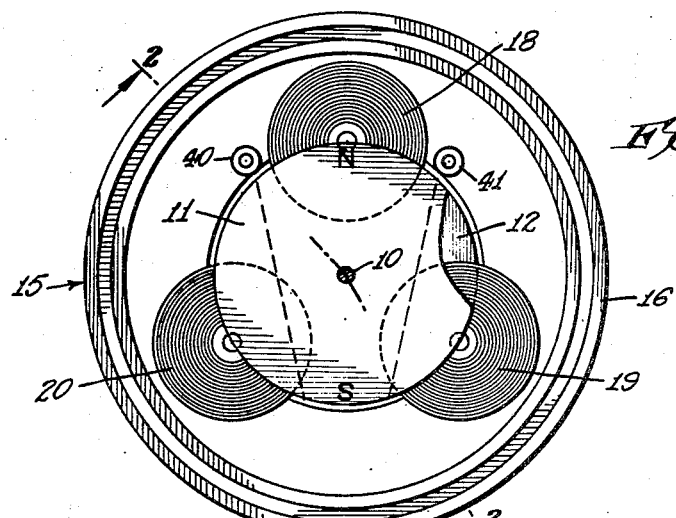

As previously mentioned, magnet discs such as discs 11 and 12 are magnetized, usually by means of a magnetizing machine, in such a manner that comparatively wide poles are formed one pole being usually wider than the other one, this being advantageous for producing a certain scale characteristic of the instrument. In Fig. 1, there is indicated the approximate zone of magnetization of magnet disc 11 by dashed lines. It should of course be understood that actually the zone of magnetization has no such sharply defined borders and the lines of Fig. 1 merely indicate the section of the magnetized zone in which the strength of magnetization sharply declines. The magnetization of the lower magnet disc 12 is similar to the one of disc 11 but reversed as to polarity.

According to the invention two magnets 40 and 41, preferably permanent magnets, are provided which are fastened to the housing base 16 by any suitable means (not shown) and so positioned that the north poles of these magnets are located approximately adjacent to opposite edges of the north pole of magnet disc 11 as can be best seen in Fig. 1, when the rotor is in the position shown. These portions of the pole are, as previously mentioned, portions in which the pole strength per unit length along the rotor circumference greatly changes. Considering now only the two north poles of magnets 40 and 41, it will be apparent that the desirable equilibrium position of the rotor assembly is that for which the south pole of the magnet disc 11 is located midway between the two magnets, being equally attracted by them. The rotor assembly will tend to move toward this position from all positions that it may have, except from the dead zone. Consequently, the above mentioned position in which the south pole of the magnet disc 11 lies midway between the two magnets is a suitable off-scale position for pointer 36 and may be employed as such.

The position of the rotor assembly illustrated in Fig. 1 in which the north pole of the magnet disc 11 lies midway between the north poles of the pointer return magnets is the center of the dead zone and is an equilibrium position since the two return magnets equally repel the disc north pole and produce opposing equal torques. Any slight shift from the center position will result in bringing more of the north pole of the magnet disc 11 under the influence of one of the pointer return magnets and markedly disturb the balance of force as above defined so that the resultant force no longer is in a line through bearings 13 and 14 and the north poles of the return magnets will no longer equally repel the north pole of the magnet disc 11. Stated differently, a small rotor movement causes opposite large changes in the distribution of the repelling north pole closely adjacent to each of the stationary poles thereby producing relatively large changes in the directions of the balanced repulsion forces from the stationary poles in response to a relatively small rotor movement. Consequently, a slight deviation from the center of the dead zone produces enough torque to permit the rotor assembly to turn into the position in which the south pole of the magnet disc 11 lies midway between the two pointer return magnets, this being the off-scale position of the pointer as explained above. In other words, the provision of two return magnets located as shown in Fig. 1 reduces the width of the dead zone appreciably without necessitating an undesirable reduction of the width of the magnetized pole zone.

It will now also be obvious that, if a single pointer return magnet were employed, as is conventional, then for any position in which part of the wide north pole of the magnet disc 11 is directly over the north pole of the single pointer return magnet, the repulsion between the two north poles would be practically in a line through the rotor bearings. As a result, there would be no torque tending to turn the rotor assembly into the off-scale position of the pointer.

The lower magnet disc 12 having a polarity opposite to that of the upper disc, will cooperate with the south poles of the return magnets as has been described for the north poles of the return magnets, thereby doubling the effectiveness of the pointer return device.

While the invention has been described in detail with respect to a certain now preferred example and embodiment of the invention it will be understood by those skilled in the art after understanding the invention, that various changes and modifications may be made without departing from the spirit and scope of the invention and it is intended therefore, to cover all such changes and modifications in the appended claims.

What is claimed is:

1. A rotor return device for a measuring instrument of the type described including a magnet rotor and a plurality of coils magnetically coacting with the rotor and connected to be differentially energized comprising a pair of stationary magnets mounted in spaced positions such that when the rotor is in the center of a dead zone one pole of each stationary magnet is located in a predetermined position closely adjacent to a portion of the repellable rotor pole which has large change in strength per unit length along the rotor circumference, one stationary pole being placed adjacent to a rotor pole portion changing its pole strength distribution in one direction and the other stationary pole being placed adjacent to a second rotor pole portion changing its pole strength distribution in the opposite direction for effecting relatively large opposite changes in the direction and strength of the balanced repulsion forces from the respective poles of the stationary magnets in response to a comparatively small rotor movement away from the said center of dead zone rotor position.

2. A rotor return device for a measuring instrument of the type described including a magnet rotor having wide poles and a plurality of coils magnetically coacting with the rotor and connected to be differentially energized, comprising a pair of stationary permanent magnets mounted in positions in which one pole of each stationary magnet is positioned closely adjacent to the poles of the magnet rotor, and in which the circumferential distance between the aforesaid poles of the stationary magnets corresponds substantially to the circumferential distance between portions of the repellable motor pole within which the pole strength per unit length along the rotor circumference sharply declines in opposite directions for effecting relatively large opposite changes in the direction and strength of the balanced repulsion forces from the respective poles of the stationary magnets in response to a comparatively small rotor movement.

3. A rotor return device as described in claim 2 wherein the magnet rotor poles are of different widths and the repelled poles of the stationary magnets are positioned closely adjacent to the said portions of the rotor pole having the greater width.

4. A ratiometer of the type described comprising a rotatably supported rotor including two permanent magnet members mounted spaced apart and constructed and positioned to form a substantially closed magnetic circuit, a plurality of stationary coils positioned between said magnet members for magnetic coaction therewith, and a pair of stationary magnets mounted in positions in which one pole of each stationary magnet is positioned closely adjacent to the poles of one of the rotor members and in which the circumferential distance between the aforesaid poles of the stationary magnets corresponds substantially to the circumferential distance between portions of the repellable pole of the said rotor member within which pole portions the pole strength per unit length along the rotor member circumference sharply declines in opposite direction for effecting relatively large opposite changes in the direction and strength of the balanced repulsion forces from the respective poles of the stationary magnets in response to a comparatively small rotor movement.

5. A ratiometer of the type described comprising a housing, a rotor assembly including a shaft rotatably mounted in the housing and two substantially disc-shaped permanent magnet members mounted spaced apart on said shaft and positioned to form a substantially closed magnetic circuit, a plurality of stationary coils mounted within the housing and positioned between said rotor members for magnetic coaction therewith, a pair of stationary magnets mounted within the housing in positions in which one pole of each stationary magnet is positioned closely adjacent to the poles of one of the rotor members and in which the circumferential distance between the aforesaid poles of the stationary magnets corresponds substantially to the circumferential distance between portions of the repellable pole of the said rotor member within which pole portions the pole strength per unit length along the rotor member circumference sharply declines in opposite direction for effecting relatively large opposite changes in the direction and strength of the balanced repulsion forces from the respective poles of the stationary magnets in response to a comparatively small rotor movement.

6. A rotor return device for a measuring instrument including a magnet rotor, comprising a pair of stationary magnets mounted in spaced positions such that when the rotor is in the center of a dead zone one pole of each stationary magnet is located in a predetermined position closely adjacent to a portion of the repellable rotor pole which has large change in strength per unit length along the rotor circumference, one stationary pole being placed adjacent to a rotor pole portion changing its pole strength distribution in one direction and the other stationary pole being placed adjacent to a second rotor pole portion changing its pole strength distribution in the opposite direction for effecting relatively large opposite changes in the direction and strength of the balanced repulsion forces from the respective poles of the stationary magnets in response to a comparatively small rotor movement away from the said center of dead zone rotor position.

CLARENCE A. DE GIERS.
SOREN B. OSTERLUND.

REFERENCES CITED

The following references are of record in the file of this patent:

UNITED STATES PATENTS

| Number | Name | Date |
| --- | --- | --- |
| 1,653,947 | Decker | Dec. 27, 1927 |
| 2,372,002 | Kelly | Mar. 20, 1945 |
| 2,401,160 | Jewell | May 28, 1946 |